July 7, 1931. A. J. LEWIS 1,813,705
CHUCK
Filed Nov. 2, 1928
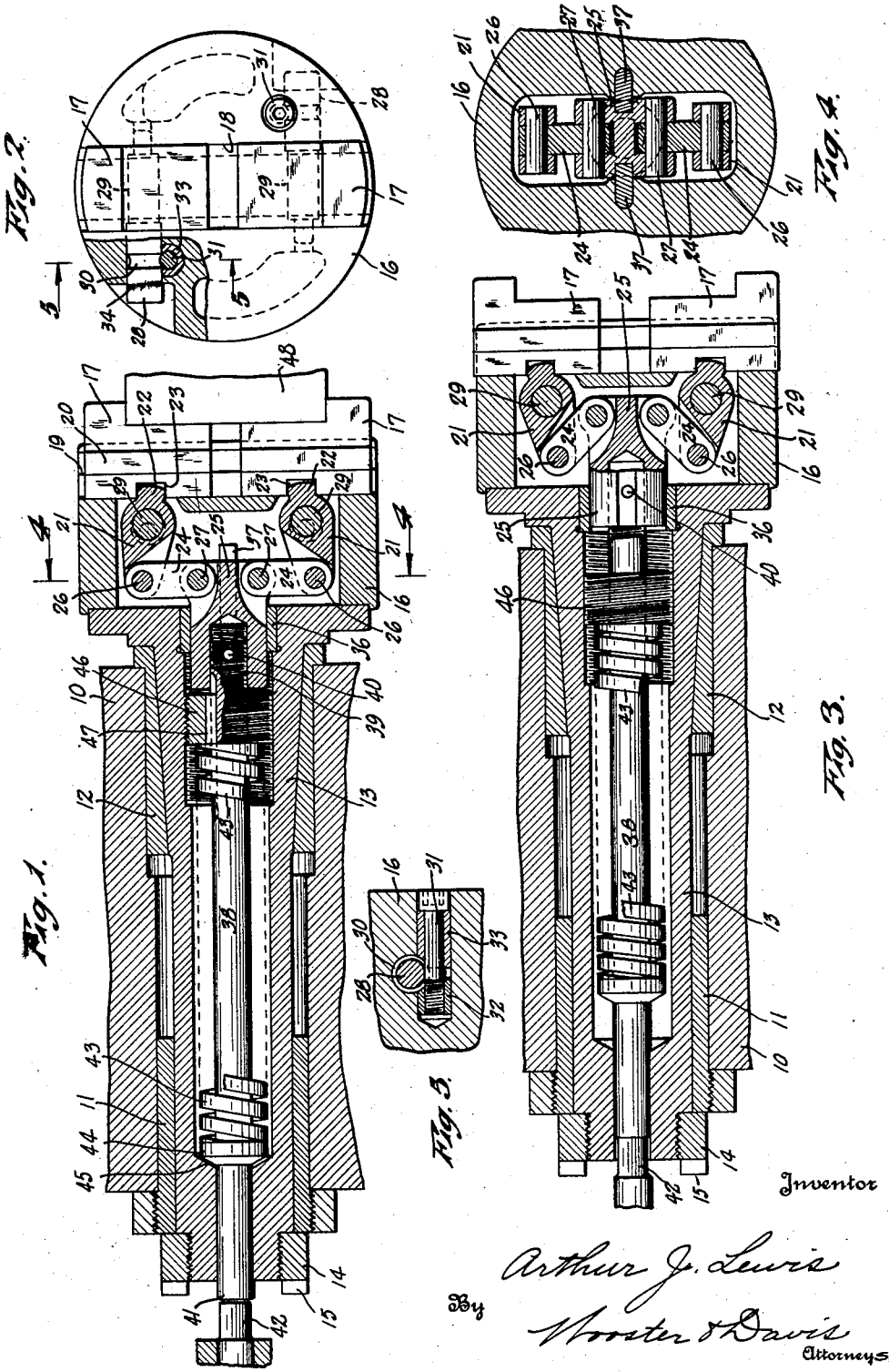

Patented July 7, 1931

1,813,705

UNITED STATES PATENT OFFICE

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT

CHUCK

Application filed November 2, 1928. Serial No. 316,662.

This invention relates to a chuck, particularly to a chuck which may be operated automatically, although it is not limited to such operation, and has for an object to provide a construction which can be used in a multiple spindle chucking machine of the type illustrated in my copending application Serial No. 310,156, filed October 3, 1928, but it is equally adapted for use on a single spindle machine.

It is also an object of the invention to provide improved means for operating the jaws of the chuck in which there is positive movement thereof in both directions to clamp the work or release it.

It is another object of the invention to provide a construction in which a comparatively small force may provide a large clamping force at the jaws.

With the foregoing and other objects in view, the invention consists in certain novel features of construction, combinations and arrangements of parts as will be more fully described in connection with the accompanying drawings. In these drawings, Fig. 1 is a longitudinal section through a chuck involving my improved construction and a portion of a rotatable turret in which it may be mounted, the jaws of the chuck being shown in clamping or work holding position.

Fig. 2 is an end view looking from the right of Fig. 1 with a wall broken away to more clearly show the construction.

Fig. 3 is a section similar to Fig. 1 showing the jaws in open position.

Fig. 4 is a transverse section substantially on line 4—4 of Fig. 1, and

Fig. 5 is a detail section substantially on line 5—5 of Fig. 2.

In the drawings 10 indicates a rotatable turret which may carry a plurality of spindles, as indicated in my application above specified, or it may be a stationary support. Mounted in this support are bearing bushings 11 and 12 for my improved chuck which includes a hollow rotatable spindle 13 mounted in these bushings and rotated by any suitable means, such as a clutch jaw, not shown, adapted to cooperate with a clutch jaw 14 mounted on the spindle and having clutch teeth 15. The spindle has at one end a head 16 which has radial guideways for one or more chuck jaws 17. In the present instance, two of these jaws are shown moving in opposite directions in a transverse guideway 18 in the head. The side walls of this guideway have channels 19 in which ribs 20 on the jaws are adapted to slide and which cooperate to retain the jaws in the head.

Each jaw is connected to a pivoted lever 21 located back of the jaw in the head, and this lever has a tongue 22 extending into a recess 23 in the rear wall of its jaw. The other end of the lever is connected by a link 24 to an operating block 25 mounted for reciprocating movements longitudinally of the axis of the spindle, the links 24 being pivoted to the levers and the block 25 by the pivot pins 26 and 27 respectively. The levers and the block are preferably forked so as to straddle the links. The levers are mounted on transverse pivot pins or studs 28 which have bearings in the head and the lever, the bearing 29 in the lever being eccentric to those in the head so that on turning movements of the pin the position of the lever may be adjusted. The pin may have a circumferential groove 30 in which a transverse clamping screw 31 extends and this screw is threaded at one side of the pin in a sleeve 32, while the sleeve 33 is slidable on the screw 31 on the opposite side of the pivot pin, and by turning the screw 31 the sleeves 32 and 33 may be clamped against opposite sides of the pin to prevent its turning in the head after it has been adjusted. The cooperation of the screw 31 and the groove 30 retain the pivot pin in the head. The head of the pin may be provided with a scale 34 to indicate various positions of the pin.

The block 25 is mounted for sliding movements longitudinally of the spindle. It may be guided in the bushing 36 and may be further guided by keys 37 mounted in the head extending into longitudinal slots in the opposite sides of the block. The block is reciprocated by means of a rod 38 extending longitudinally of the spindle and secured at one end to the block by any suitable means, such as a screw thread 39 and a pin 40. At its opposite end the rod 38 is slidable in the spindle and is accessible, as shown at 41, for operation by any suitable means, such as a stud 42, which may be operated by a cam or other suitable means as described in my application above mentioned. The rod 38 is embraced by a spring 43 which engages a washer 44 at one end secured to the rod while at its other end the spring rests against a stop bushing 46 threaded in the spindle. The rod 38 slides in the bushing 46 but is splined thereto by a key 47 which will allow sliding movement of the rod but will prevent its turning in the bushing. Therefore, rotation of the rod will adjust the bushing 46 longitudinally of the spindle to vary the tension of the spring 43. The collar or washer 44 is secured to the rod 38, and therefore, spring 43 tends to force this rod to the left or to the position of Fig. 1, the shoulder 45 limiting the movement in that direction. This movement of the rod carries with it the block 25 which will straighten out the links 24 and operate the levers 21 to force the jaws 17 inwardly or toward each other and clamp the work 48.

It will be apparent from an inspection of Fig. 1 that the elements are so proportioned and arranged as to have the jaws clamped just before the links 24 come into a straight line. This arrangement gives the effect of a toggle action which gives an immense clamping pressure on the work with a relatively small pressure on the block 25. The adjustable pivot pins 28 for the jaws permit adjustment of the jaws and their operating levers 21 for variations in the work and to give the maximum clamping effect, which, as indicated above, is just before the links come into a straight line. It will also be apparent that as the links 24 are nearly in a straight line, outward pressure on the jaws 17 cannot shift the block 25, and therefore, no locking device is required to lock the jaws in the clamped position. Another important feature of the eccentric mounting for the levers 21 is that by rotating the pins 28 the lugs 22 on the levers may be withdrawn from the recesses 23 in the jaws permitting the jaws to be slid from the head.

To release the work all that is necessary is to push inwardly on the end 41 of the rod 38, as indicated in Fig. 3, by the member 42. This forces the block 25 to the right to the position shown, and by shifting links 24 will manipulate the levers 21 to separate the jaws 17. It will also be apparent from this arrangement that in clamping the jaws, that is, moving them from the position of Fig. 3 to that of Fig. 1, a given movement of the block 25 gives the greatest amount of movement to the jaws during the first part of their movement toward clamping position when the least force is required, and the smallest movement of the jaws for a given movement of the block is secured at the time the jaws are clamped on the work, or the position of Fig. 1, so that a relatively small force on the block 25 will give a large clamping force. This action is due to the inclined arrangement of the links 24 at the beginning of the inward movement of the jaws, as shown in Fig. 3, and the great clamping effect is secured by the toggle action when these links approach alignment as indicated in Fig. 1.

It will be apparent that with this construction and arrangement very few elements are required, and therefore, the construction is a very simple one, and an immense clamping pressure may be applied to the jaws with a relatively small operating force. As the links 24 are in substantial alignment when the jaws are clamped on the work there can be no reverse movement of the operating block 25 by pressure from the jaws. Therefore, no locking means is required. It will, of course, be obvious that other means than the spring 43 and the element 42 may be used for operating rod 38 and block 25 for manipulating the jaws of the chuck. It will also be apparent that there is positive operation of the jaws in both directions. Although I have shown a chuck involving two jaws this same mechanism may be used in a chuck having one or three or more movable jaws.

Having thus set forth the nature of my invention, what I claim is:

1. In a chuck, a circular head having radial guideways in the face thereof and a chamber communicating with said guideways, jaws mounted to slide in said guideways, levers pivotally mounted in the chamber and enclosed by the walls thereof, means for connecting the levers to the jaws, a hollow rotatable spindle carrying the head, a block mounted to slide longitudinally in the spindle, links pivoted to the block and the levers to form a toggle therewith, a longitudinal rod in the spindle connected to the block for shifting it, and a spring in the spindle tending to shift the rod to close the jaws.

2. In a chuck, a circular head having radial guideways in the face thereof and a chamber communicating with said guideways, jaws mounted to slide in said guideways and having recesses in their inner walls, levers pivotally mounted in the chamber and enclosed by the walls thereof and each having a lug to enter the recess in one of the jaws, a hollow rotatable spindle carrying the head, a longitudinally slidable block enclosed by the spindle and head, links pivoted to the block and the levers to form a toggle therewith, means within the spindle for shifting the block to open the jaws, and a spring within the spindle tending to shift the block to close the jaws.

3. In a chuck, a circular head having a radial slot, a jaw mounted for sliding movements in the slot and having a recess in a side wall thereof, a lever having a lug projecting into said recess to shift the jaw, a pivot pin having bearings so as to turn in the support and also having an eccentric bearing for the lever offset sufficiently from the first bearings so as to remove the lug from the recess when turned to its extreme position and permit withdrawal of the jaw from the head, means for securing the pivot pin in different positions, a movable block, and an operating link pivoted to the block and the lever.

4. In a chuck, a rotatable support, a jaw mounted for radial movement in the support, a lever connected to the jaw, a pivot pin mounted to turn in the support and having an eccentric bearing for the lever, means whereby the pin may be turned to adjust the position of the lever, means for operating the lever to shift the block, said pin having a circumferential groove, a clamping screw extending transversely in said groove, sleeves on the screw on opposite sides of the pin, and connections between the screw and the sleeves to clamp them against the pin in the groove to hold the pin in adjusted positions.

In testimony whereof I affix my signature.

ARTHUR J. LEWIS.